United States Patent
Arita

(10) Patent No.: US 9,014,896 B2
(45) Date of Patent: Apr. 21, 2015

(54) VEHICLE CONTROL SYSTEM, SERVER AND VEHICLE CONTROL DEVICE

(71) Applicant: Nissan Motor Co., Ltd., Yokohama-shi, Kanagawa (JP)

(72) Inventor: Hiroshi Arita, Machida (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 135 days.

(21) Appl. No.: 13/934,321

(22) Filed: Jul. 3, 2013

(65) Prior Publication Data

US 2014/0012449 A1 Jan. 9, 2014

(30) Foreign Application Priority Data

Jul. 5, 2012 (JP) ................................. 2012-151016

(51) Int. Cl.
 *G06F 17/00* (2006.01)
 *B60W 20/00* (2006.01)
(52) U.S. Cl.
 CPC ............. *B60W 20/00* (2013.01); *Y10S 903/903* (2013.01); *Y02T 10/6221* (2013.01)

(58) Field of Classification Search
None
See application file for complete search history.

(56) References Cited

U.S. PATENT DOCUMENTS

2009/0091439 A1* 4/2009 Sekiyama et al. ............ 340/459
2012/0179359 A1* 7/2012 Profitt-Brown et al. ...... 701/123

FOREIGN PATENT DOCUMENTS

WO 9821077 A 5/1998

* cited by examiner

*Primary Examiner* — Thomas Tarcza
*Assistant Examiner* — Garrett Evans
(74) *Attorney, Agent, or Firm* — Young Basile

(57) ABSTRACT

A vehicle control system, a server and a vehicle control device which improve energy efficiency of a vehicle based on the information of other vehicles is provided. The system includes a first energy information acquiring mechanism that acquires energy information indicating the energy efficiency of the vehicle including at least accelerator pedal opening information, an identification mechanism that identifies the vehicle of good energy efficiency among a plurality of vehicles based on the energy information, and a drive system control mechanism that controls the drive system of the own vehicle based on the accelerator pedal opening of the other vehicle that has been identified as energy efficient.

14 Claims, 10 Drawing Sheets

| | MEASUREMENT TIME | POSITION | VEHICLE MODEL | ACCELERATOR OPENING | POWER CONSUMPTION RATE | FUEL CONSUMPTION RATE |
|---|---|---|---|---|---|---|
| VEHICLE A | 17:20 | aaa bbb | MID | 10 | 80 | 0 |
| VEHICLE B | 8:15 | ccc ddd | SMALL | 20 | 95 | 22 |
| VEHICLE C | 16:18 | eee fff | LARGE | 7 | 70 | 0 |
| VEHICLE D | 17:17 | aaa bbb | MID | 8 | 75 | 0 |
| VEHICLE E | 16:15 | ggg hhh | MINI | 23 | 98 | 25 |

| MODEL | VEHICLE j | MEASUREMENT TIME | ACCEL. OPENING | POWER CONSUMPT RATE |
|---|---|---|---|---|
| LIGHT | F | 17:20 | 10 | 80 |
| SMALL | G | 17:27 | 11 | 90 |
| MID | D | 17:17 | 8 | 75 |
| LARGE | F | 17:19 | 15 | 90 |

VEHICLE CONTROL SYSTEM, SERVER AND VEHICLE CONTROL DEVICE

CROSS-REFERENCE TO RELATED APPLICATIONS

This application claims priority under 35 U.S.C. §119 to Japanese Patent Application No. 2012-151016 filed Jul. 5, 2012, the entire disclosure of which is hereby incorporated herein by reference.

TECHNICAL FIELD

The present invention generally relates to a vehicle control system, a server therefore and a vehicle control device.

BACKGROUND

Conventionally, in PCT Application Publication No. WO 98/21077 A, a vehicle information communication system is known in which a dealer, an information center, or a technical center to which a vehicle belongs to or is assigned to collect as characteristic values of electronic control of the vehicle such parameters as the timing of head lamp device (length or luminance) and shift pattern of an automatic gear shift device and acquires optimum parameters based on parameters having high frequencies or the variation trends in parameters over time to transmit to the vehicle the best vehicle information or update to the optimum parameters.

However, in the conventional technique described above, even when the own vehicle is updated with its parameter by the parameter that is transmitted from the dealer and the like, the energy efficiency of the own vehicle will not be improved.

BRIEF SUMMARY

The present invention provides a vehicle control system, server and vehicle control device which may improve an energy efficiency of the own vehicle based on the information from other vehicles.

The object described above may be achieved by obtaining energy information indicative of energy efficiency of a vehicle, identifying a vehicle with good energy efficiency among a plurality of vehicles based on the energy information, and controlling a drive system provided in the own vehicle based on an accelerator pedal opening degree of the vehicle identified with good energy efficiency.

According to the present invention, since the drive system of own vehicle may be controlled on the basis of the accelerator pedal opening degree of the other vehicle with better fuel efficiency than the energy efficiency of the own vehicle, the own vehicle may be driven by the drive system of the vehicle at the energy efficiency close to the energy efficiency of the other vehicle, and it is possible to thereby improve energy efficiency.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
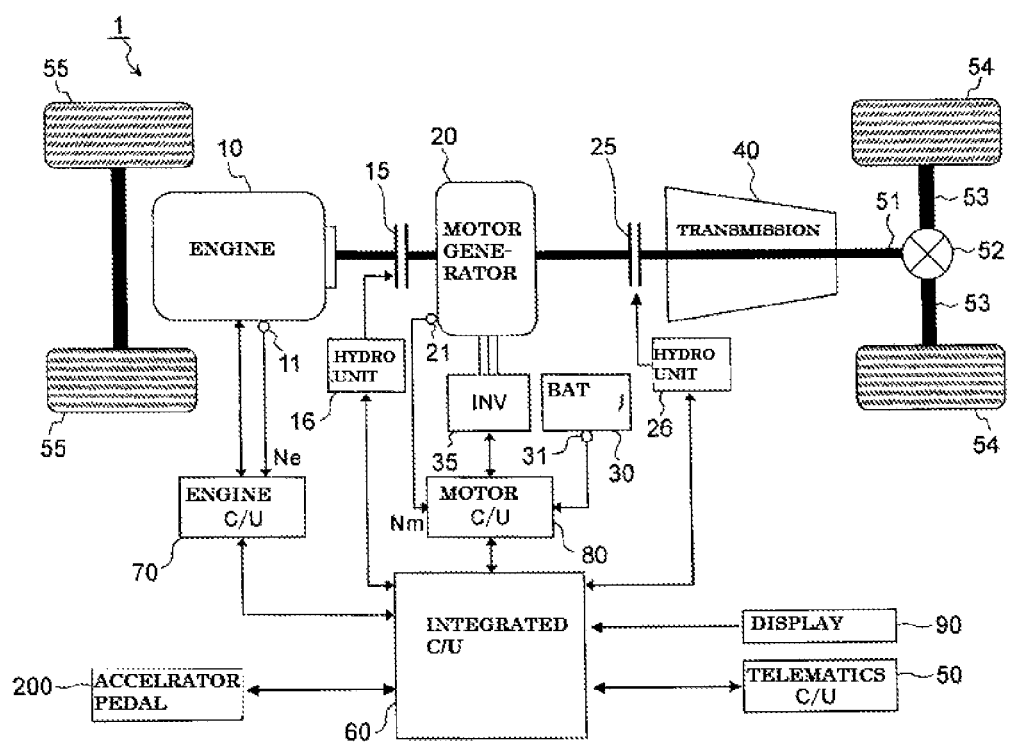
FIG. 1 is a block diagram of a vehicle according to the vehicle control system in the present embodiment.

The hybrid vehicle 1 of the embodiment according to the present invention is a vehicle having a parallel system using a plurality of power sources for propulsion of the vehicle. As shown in FIG. 1, the hybrid vehicle 1 is provided with an internal combustion engine 10 (hereinafter referred to as "engine"), first clutch 15, motor/generator 20 (motor and generator), second clutch 25, battery 30, inverter 35, automatic transmission 40, propeller shaft 51, differential gear unit 52, drive shaft 53, left and right driving wheels 54A, an accelerator pedal device 200 and a display 90. Hereinafter, although the present invention will be described as applied to a hybrid vehicle of parallel type, the present invention is also applicable to a hybrid vehicle of other systems. Further, instead of the automatic transmission 40, a continuously variable transmission (CVT) may also be used.

The engine 10 is an internal combustion engine driven by gasoline, light oil, etc., and a valve openness of throttle valve, fuel injection amount, ignition timing, etc. are under control based on a control signal from the engine control module or unit 70.

This engine 10 is provided with an engine rotation speed sensor 11 to detect engine rotation speed Ne.

The engine 10 is an internal combustion engine that runs as a diesel fuel or gasoline, based on a control signal from engine control module 70, the valve opening degree of the throttle valve, the fuel injection amount, ignition timing, etc. are controlled. The engine 10, engine speed sensor 11 for detecting the engine rotational speed Ne is provided.

The first clutch 15 is interposed between the output shaft of the engine 10 and the rotating shaft of the motor/generator 20, and is thus selectively connected and disconnected for torque transmission between engine 10 and motor/generator 20. As an example of first clutch 15, a multiple-plate wet clutch may be enumerated for continuously controlling the hydraulic flow rate and hydraulic pressure by way of a linear solenoid. At the first clutch 15, hydraulic pressure of hydraulic unit 16 is controlled based on the control signal from unified control unit 60, and clutch plates will be engaged (including engagement under a slipped state) or released.

The motor/generator 20 is a synchronous type motor/generator in which permanent magnets are embedded in a rotor and stator coils are wound around the stator. This motor/generator 20 is provided with a motor rotation speed sensor 21. This motor/generator 20 functions not only as an electric motor but also as a generator. When supplied with a three phase alternate power from inverter 35, motor/generator 20 is driven to rotate (drive mode). On the other hand, when rotor rotates by external force, motor/generator 20 produces the AC power by causing electromotive force at both ends of the stator coils (regeneration). The AC power generated by the motor generator 20 is charged to the battery 30 after being converted to direct current by the inverter 35.

Examples of battery 30 are lithium ion secondary battery or nickel-hydrogen secondary battery. A current-voltage sensor 31 is attached to the battery 30 and these detection outputs are output to the motor control unit 80.

The automatic transmission 40 has a multiple-step transmission with speed ratios such as seven forward and one reverse speed ratios, which is subject to switch or change automatically depending on vehicle speed, accelerator pedal opening, etc. This automatic transmission 40 may change speed ratios in accordance with control signal from the unified control unit 60. The output shaft of automatic transmission 40 is coupled to left and right drive wheels 54 via differential gear unit 52, left and right drive shafts 53. Note that reference "55" denotes steered wheels.

The telematics control unit 50 is provided with a communication device for transmitting and receiving external to the vehicle and includes a communication unit or device for transmitting and receiving information to and from the server, and a communication device for transmitting and receiving information with a plurality of the other vehicles running in the surroundings of the vehicle. The communication device for communication with the server transmits and receives signals in a communication system suitable for long-distance communication. In addition, the communication device for communication with other vehicles, as compared with the communication device for the server, is configured to transmit and receive signals in a communication system that is suitable for short-range communication. Further, telematics control unit 50 is connected via a CAN communication with integrated control unit 60.

Display 90 is configured to provide a display device for displaying information or the like which is managed by the navigation system in the integrated control unit 60 for notifying the occupant information.

Figure 2:
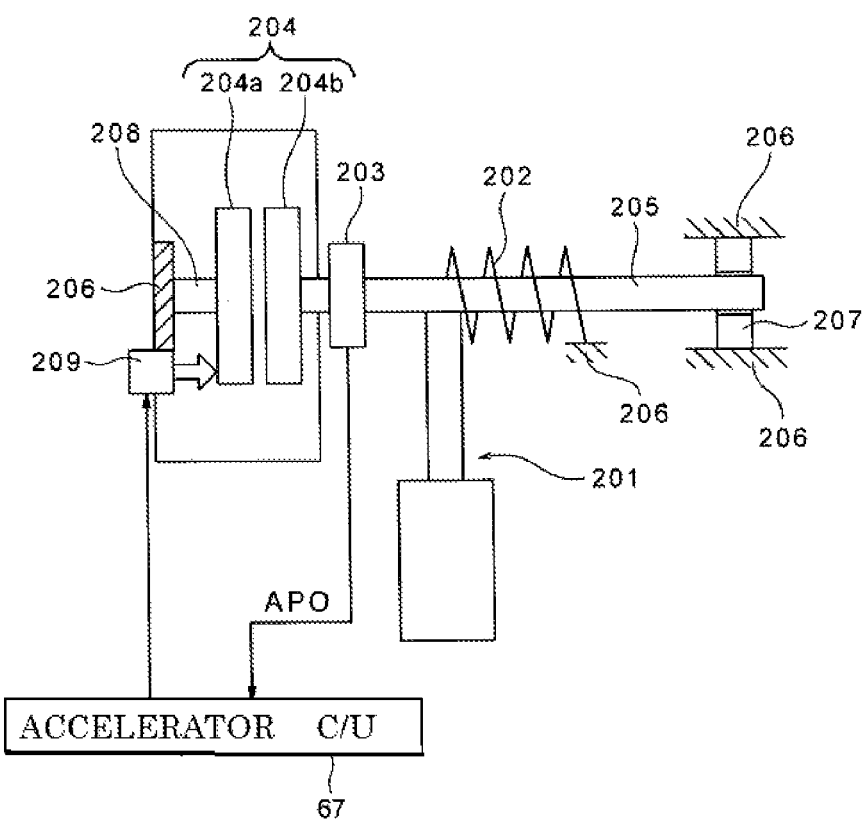
FIG. 2 is a block diagram of the accelerator pedal device of FIG. 1.

The accelerator pedal device 200 is intended to drive an accelerator pedal at variable tread or depression force (operation reaction force). FIG. 2 shows a specific configuration of the accelerator pedal device 200. FIG. 2 is a block diagram of the accelerator pedal device. Incidentally, the configuration of the accelerator pedal device 200 is not limited to the configuration shown in FIG. 2, but may be of other configurations.

The accelerator pedal device 200 includes an accelerator pedal 201, a return spring 202, an accelerator pedal opening sensor 203, and a variable friction plate 204. The accelerator pedal 201 is a pedal which receives the tread or depression force of the driver, and installed at a rotation shaft 205 attached to allow to swing about the rotation shaft 205 as swinging fulcrum. Return spring 202 is an elastic member and is fixed to the vehicle body 206 at one end while fixed to the rotation shaft 205 at the other end, giving a reaction force in the closing direction of the accelerator pedal 201.

One end of the rotation shaft 205 is freely rotatably supported via a bearing 207 on a vehicle body. Adjacent to the other end of the rotation shaft 205 is provided an accelerator pedal opening sensor 204 to detect the opening degree (accelerator opening: APO) of the accelerator pedal 201. The accelerator pedal opening sensor 203 transmits the opening degree of the accelerator pedal to the integrated control unit 60.

The variable friction plate gives a frictional force to the rotation of the rotating shaft 205 and has a pair of friction members 204a and 204b. Friction member 204b is fixed to the other end of the rotating shaft 205. The friction member 204a is supported by a fixed shaft 208 through the spline, etc. The friction member 204a is movable in the axial direction of the rotation shaft 205 (i.e., with respect to that of fixed shaft 208), but is not rotatable in the rotational direction.

The actuator 209 is capable of setting the depression force at the time of depression of the accelerator pedal 201 (operation reaction force), in response to a control signal from the accelerator pedal control unit 67, by driving the friction member 204a in the axial direction of the rotation shaft 205 through actuator 209 fixed to the vehicle body 206 in order to vary the friction force between the friction member 204 and the friction member 204b.

In other words, with respect to a reference tread or depression force of the accelerator pedal 201 in the case in which no frictional force is generated between the friction member 204a and the friction member 204b with both being out of mutual contact, the depression force of accelerator pedal 201 at the time at which a frictional force is generated between friction members 204a, 204b by driving actuator 209 will be higher. Thus, when the variable friction plate 24 operates in response to actuator 209, the depression force of accelerator pedal 201 will be controlled to increase and the depression amount (accelerator pedal opening degree) by the driver will be suppressed.

By adjusting the friction force between the friction member 204a and the friction member 204b, it is possible to adjust the amount of increase in pedal depression force. Further, by changing the threshold value of the accelerator pedal opening degree at which the friction member 204a and the friction member 204b are brought into contact, it is possible to change the operation depression amount required to increase depression force with respect to the operation amount of the accelerator pedal, For example, when the friction member 204a and the friction member 204b are set so as to contact at a threshold value when the accelerator opening is small, then, the driver receives a reaction force at the accelerator depression amount being small so that the depression amount will be suppressed.

Returning to FIG. 1, in the hybrid vehicle 1 in the present embodiment, three drive modes are available to be switched depending on the engagement/release states of first, second clutches 15, 25.

The first drive mode is an electric motor drive mode (hereinafter called "EV mode"), which is achieved by releasing the first clutch 15 and engaging second clutch 25 such that vehicle is propelled by the motor/generator 20 as sole power source for driving the vehicle.

The second drive mode is an engine-employing drive mode or a hybrid drive mode (hereinafter called "HEV mode"), which is achieved by engaging both the first clutch 15 and second clutch 25 such that the vehicle travels by engine 10 in addition to motor/generator 20 as power source The third drive mode pertains to a slip drive mode (hereinafter called "WSC drive mode") which is achieved by maintaining second clutch 25 in a slipped state and vehicle is propelled by at least one of engine 1 and motor/generator 20 as power source. This WSC drive mode is in place to achieve a creep travel especially when the SOC (the amount of charge, State of Charge) is low, at a low temperature of cooling water of engine and the like.

Note that in a transitional state from EV mode to HEV mode, the first clutch that has been released is engaged and engine 10 will be started by making use of torque of motor/generator 20.

Moreover, the HEV mode further includes an "engine drive mode", a "motor assist drive mode", and a "power generating travel mode.

In the "engine drive mode", the engine 10 serves as the sole power source for propelling the drive wheels 54. In the "motor assist drive mode", both the engine 10 and the motor/generator 20 serve as power sources for propelling the drive wheels 54. In the "power generating travel mode", the engine 10 drives the drive wheels 54 while the motor/generator 20 functions as an electric generator Note that in addition to the modes described above, a power generation mode may be eventually available in a vehicle stopped state where motor/generator 20 is allowed to function as generator by making use of power of engine 10 to charge battery 30 or supplying power to electric equipment The control system of the hybrid vehicle 1 in the present embodiment is provided with a unified control unit 60, engine control unit 70, motor control unit 80, and transmission control unit 90 as shown in FIG. 1. These control units 60, 70, 80, and 90 are interconnected to each other through a CAN communication line, for example The engine control unit 70 outputs, in accordance with a target engine torque command tTe from the unified control unit 60, a command controlling an engine operation point (engine rotation speed Ne, engine torque Te) to a throttle valve actuator, injector, spark plug and the like provided with engine 10. The information about engine rotation speed Ne, engine torque Te, is supplied to the unified control unit 60 through CAN communication line. In addition, engine control unit 70 detects a fuel injection amount to manage fuel consumption.

The motor control unit 80 is configured to receive information from the motor rotation sensor 21 equipped on motor/generator 20, and, in accordance with command such as a target mortar/generator torque tTm, outputs a command controlling the operation point of motor/generator 20 (motor rotation speed Nm, motor torque Tm) to inverter 35.

The motor control unit 80 is configured to calculate and manage the state of charge (SOC) of the battery 30 based on the current value and voltage detected by current/voltage sensor 31. This battery SOC information is used for control information of motor/generator 20, and sent to unified or integrated control unit 60 via CAN communication line The motor control unit 80 manages the power consumption based on the detected values from current/voltage sensor 31.

The unified or integrated control unit 60 bears the function of driving or operating the hybrid vehicle 1 efficiently by controlling the operation point of the power train consisting engine 10, motor/generator 20, automatic transmission 40, first clutch 15, and second clutch 25.

The integrated control unit 60 calculates the operation point of the power train based on the information from each sensor acquired through CAN communication, and executes to control the operation of the engine by the control command to the engine control unit 70, the operation of the motor/generator 20 by control command to motor control unit 80, operation of automatic transmission 40 through control command to automatic transmission 40, engagement/release operation of first clutch 15 by the control command to hydraulic unit 16 of first clutch 15, and engagement/release operation of second clutch 25 by the control command to hydraulic unit 26 of second clutch 25.

Figure 3:
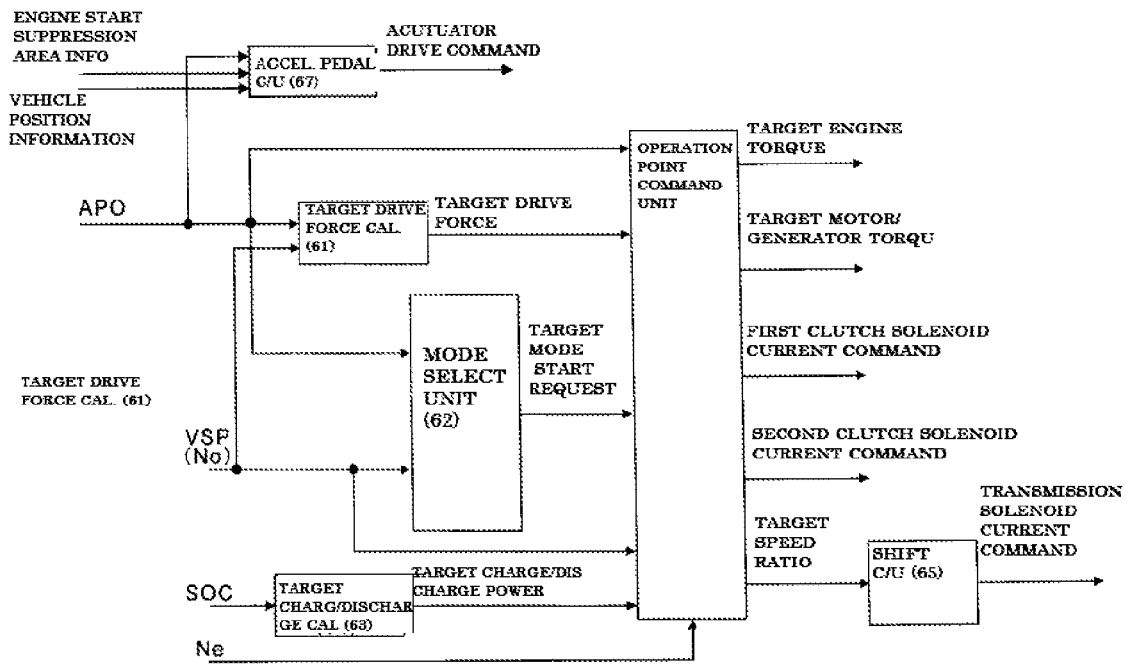
FIG. 3 is a block diagram of an integrated control unit of FIG. 1.

Now description is made of drive controls of engine 10 and motor/generator 20 out of various controls to be executed by integrated control unit 60. FIG. 3 represents a control block diagram of integrated control unit 60.

The integrated control unit 60 includes, as shown in FIG. 3, a target drive force computing section 61, a mode selecting section 62, a target charge/discharge computing section 63, an operation point command section 64, a shift control section 65, and an accelerator pedal control unit 67.

Figure 4:
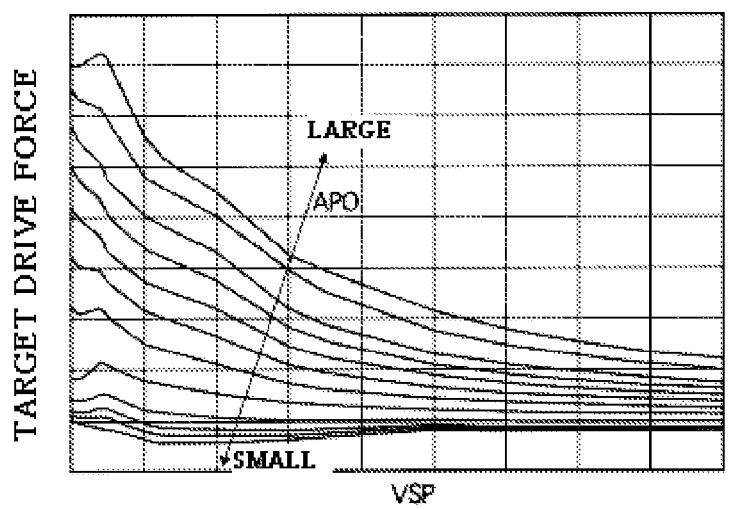
FIG. 4 is a graph showing the characteristics of the target driving force to the vehicle speed in the target driving force calculating section shown in FIG. 3.

The target driving force computing section 61 is configured to use the target driving force or torque map to compute a target driving force tFo0 based on the accelerator pedal opening APO detected by accelerator opening sensor 69 and the transmission output rotation speed No (i.e., vehicle speed VSP) detected by output rotation sensor 42 of automatic transmission 40. An example of the target drive force map is shown in FIG. 4

Figure 5:
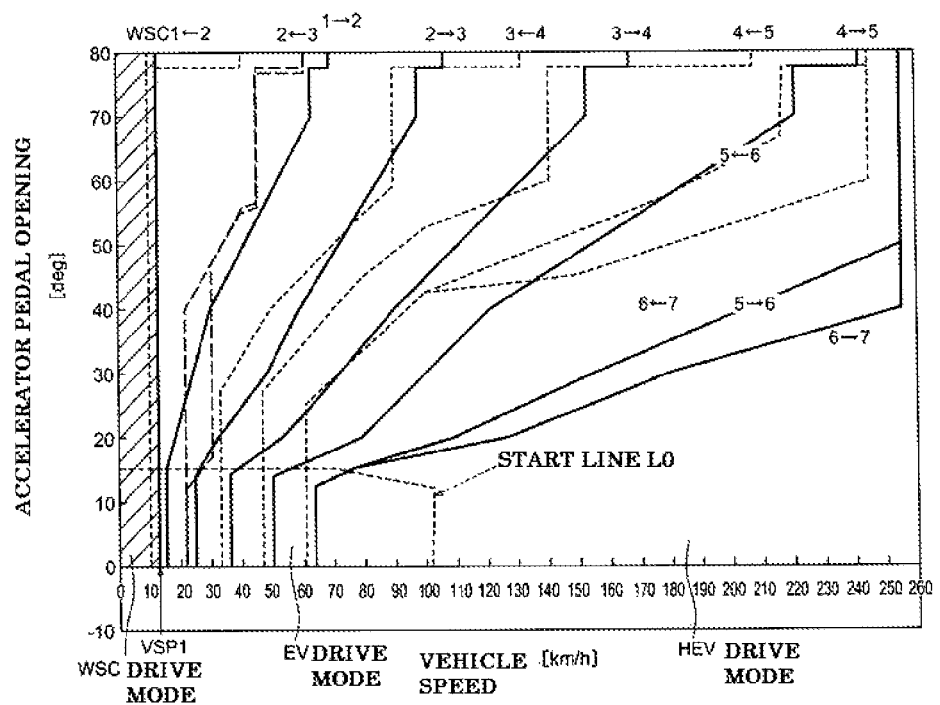
FIG. 5 is a graph showing a map of the driving mode with respect to the accelerator pedal position and vehicle speed in the mode selection unit of FIG. 3.

Referring to the mode map, the mode selection unit 62 selects a target mode. FIG. 5 shows an example of the mode map. In the mode map (shift map) in FIG. 5, depending on the vehicle speed VSP and accelerator opening APO, the regions for an EV drive mode, WSC drive mode and HEV drive mode are defined, respectively.

In this mode map, the EV mode is assigned to the inside of the engine start line Lo while the HEV drive mode is assigned to the outside of the engine start line Lo. Therefore, when transitioning or shifting from the EV drive mode to the HEV mode beyond the start line Lo, the mode selection unit 62 requires to start engine 10 toward the operation command unit 64.

Engine start line Lo represents a threshold value for starting the engine 10. When the vehicle speed VSP and accelerator opening APO are greater than the threshold, the engine 10 is started.

Further, the WSC drive mode described above is assigned respectively to the low-speed region in both the EV drive mode and the HEV drive mode (region at 15 km/h or less, for example). The predetermined vehicle speed VSP1 that defines the WSC drive mode is configured to ensure the vehicle engine 10 to rotate autonomously or sustainably. Therefore, in the region lower than the predetermined vehicle speed VSP1, it is not possible to rotate engine 10 autonomously with the second clutch 25 being engaged.

Note that, even at EV drive mode being selected, when the SOC (state of charge) is below a predetermined value, the mode may also shifts to the HEV drive mode forcibly.

The target charge/discharge calculation unit 63 calculates a target charge/discharge power tP based on SOC of battery 30 by using a previously defined target charge/discharge amount map.

The operation point command unit 64 calculates, based on accelerator pedal opening (APO), target driving force tFo0, target mode, vehicle speed VSP, target charge/discharge power tP, as target operation point of power train, a transient target engine torque tTe, target motor/generator torque tTm (target motor/torque generator torque tNM also viable), target first clutch transmission toque capacity tTc1, target second clutch transmission torque capacity tTc2, and target speed ratio of automatic transmission 40.

The target engine torque tTe is sent to the engine control unit 70 from the integrated control unit 60, and the target motor generator torque tTm (or the target/motor generator rotation speed tNm) is sent to the motor control unit 80 from the integrated control unit 60.

The operation point command unit or section 64 calculates both target first clutch torque transfer capacity tTc1 and the second clutch torque transfer capacity tTc2 under the target mode set by the mode selection unit 62, in order to generate the target driving force. In order to achieve the target first clutch torque transfer capacity tTc1 and the target second clutch torque transfer capacity tTc2, integrated control unit 60 sends solenoid current to each of the hydraulic unit 16 and 26, corresponding to the target first clutch torque transfer capacity tTc1 and target second clutch torque transfer capacity tTc2, respectively.

Further, the operating point command section 64 may allow engine 10 to start as a request on the system, regardless of the selected mode by mode selection unit 62, when SOC (charge amount: State of Charge) is decreased and the like. For example, although mode selection unit 62 selects EV mode, SOC of battery is low and the target charge/discharge calculation unit 63 calculates a target charge power to charge battery 30, then operation point command unit 64 calculates a target calculation torque to start up engine 10 via engine control module 70.

It is possible regardless of the selected mode or the like, by the mode selection unit 62, to start the engine 10 as a request on the system. For example, the mode selection unit 62 has selected the EV mode, SOC of the battery 30 is lowered, if it is calculated the target charging electric power for the target charging and discharging operation unit 63 charges the battery 30, by calculating the target operation torque, via the engine control module 70, the operating point command section 64, to start the engine 10.

Shift control unit 65 drives and controls a solenoid valve in the automatic transmission 40 so as to achieve the target shift stage along a shift schedule shown in a shift map. Here, the shift map used at this time is such that the target gear position is set in advance based on the accelerator opening APO and vehicle speed VSP as shown in FIG. 4.

Figure 6:
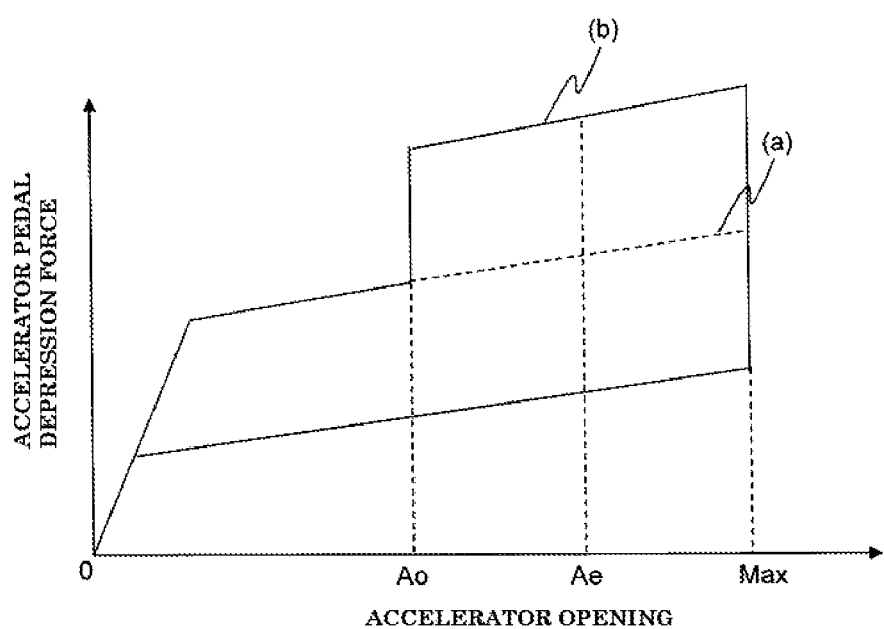
FIG. 6 is a graph showing the characteristics of the accelerator pedal depression force against the accelerator pedal in the accelerator pedal controller of FIG. 3.

The accelerator pedal control unit 67 sets a depressing or pedal force and actuate the actuator 209 based on the acceleration opening (APO), an accelerator opening of other vehicles sent from the server, and, the position information of the vehicle 1. FIG. 6 is a graph schematically showing the characteristics of the accelerator pedal depression force or effort in the present embodiment. In FIG. 6, graph or line (a) illustrates characteristics of the basic pedal force, the graph or line (b) shows a characteristic of increased pedal force or effort (increased depression force) by adding the friction by the variable friction plate.

The basic effort has an appropriate hysteresis both in the decreasing direction and the increasing direction of the accelerator opening degree, and also increases or decreases substantially proportionally with respect to the accelerator opening degree. On the other hand, according to the increased pedal effort, pedal force increases until a threshold value (Ao) for pedal force increase in the same manner as the basic pedal force. When exceeding the threshold value (Ao), however, it increases stepwise from the basic pedal force, and generally increases with respect to accelerator opening. The characteristic in the decreasing direction is the same as the basic pedal force.

The threshold value (A0) is set in the accelerator pedal control unit 67 for increasing the pedal force from the basic pedal force. Further the threshold value for pedal force increase (A0) is set lower than an accelerator pedal opening (Ae) that represents an engine startup threshold value corresponding to the engine start line L0. In other words, accelerator pedal control unit 67 increases depression force of accelerator pedal with the engine being stopped since the increase in pedal force in accelerator pedal is set at a lower degree of accelerator opening than that corresponding to the engine start line L0.

The accelerator control unit 67 may set the timing at which pedal force is increased in response to the depressing amount of accelerator pedal 201 by defining the threshold value for pedal force increase (A0). Stated another way, as the threshold (A0) decreases, the pedal force increases. By holding the pedal depressing amount small to suppress the accelerator opening of accelerator pedal 201, the power consumption of battery 30 may be suppressed.

The accelerator control 67 will sets, as described below, the pedal force of accelerator pedal 201 to either the basic pedal force or increased pedal force based on the information containing the accelerator opening of other vehicle sent from the server, and, when setting the increased pedal force, operates the actuator 209.

It will now be described with reference to FIG. 7 of the configuration of the server 100 that performs communication with the hybrid vehicle 1 (vehicle A, B) as well as the vehicle control system having vehicles A, B according to the present embodiment.

Figures 7, 8:
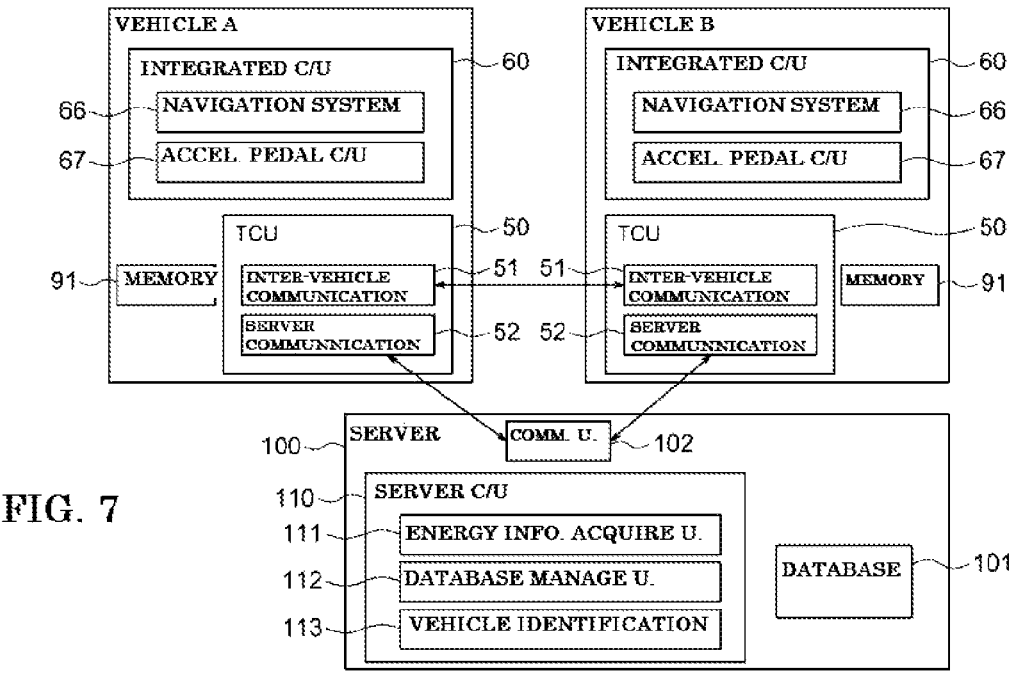
FIG. 7 is a block diagram of a vehicle control system including a hybrid vehicle in FIG. 1.
FIG. 8 is a conceptual view of data stored in the database of FIG. 7.

As shown in FIG. 7, server 100 communicates with hybrid vehicle 1 and a plurality of other vehicles 200 to acquire information of each vehicle. Server 100 communicates further with a vehicle having an engine only as propulsion source or electric vehicle, not necessarily only with hybrid vehicles. Server 100 is provided with database 101, communication unit 102, and a server control unit (server C/U) 110.

Database 101 is a recording medium for storing data from multiple vehicles received by the communication unit 102. In the present embodiment, by separating into a plurality of areas on the map, the vehicle information is stored in each area. Since the information sent from vehicles A, B includes positional information of vehicles A, B, by storing information in the areas corresponding to the positional information, the information of vehicles A, B is stored by area.

The communication unit 102 is a communication device which communicates with the server communication section 52 of the Telematics Control Unit (TCU) 50. Server C/U 110 represents a controller that controls the entire server 100.

Server C/U 110 has an energy information acquiring unit 111, a database management section or unit 112, and a vehicle identification section or unit 113. Based on the information the vehicles A and B received by the communication unit 102, the energy information representing the energy efficiency of the vehicle is obtained and recorded in the database 101.

Here, the energy information is described. The energy information includes power consumption rate and fuel consumption rate representative of vehicle energy efficiency. The power consumption rate may be expressed as a rate of power consumption of battery 30 and may be expressed by a power consumed per "one" km, i.e., (Wh/km). The power consumption rate is managed by the motor control unit associated with each vehicle A, B.

The fuel consumption rate, on the other hand, is expressed a rate of fuel consumption consumed by engine 10 at the drive mode of the vehicle A, B is in either HEV drive mode or WSC drive mode, and is generally referred to as fuel consumption rate. The fuel consumption rate may be expressed by travel distance (km) per "one" liter. The fuel consumption of vehicles A, B is managed by engine control unit 70 associated with respective vehicles A, B.

In addition, in the present embodiment, as information relevant to the information indicative of vehicle energy efficiency, the measured time of the power consumption rate and the fuel consumption rate, the vehicle position at which these consumption rates are measured, and the information relevant to the model of the vehicles A, B are included in the energy information. As descried below, server 100 manages the energy efficiency of the plurality of vehicles by each area of multiple areas. Therefore, the energy information contains the vehicle positional information. In addition, the energy efficiency of vehicles A, B may depend on the area condition, travelling time, and models of vehicles A, B. Therefore, in the present embodiment, the energy information contains measurement time and information on models or vehicle types. Incidentally, the models may be distinguished by displacement volume, weight, or vehicle series. Alternatively, the models may be distinguished by drive system such as a hybrid vehicle, a plug-in hybrid vehicles, electric vehicles, etc.

As described below, in the present embodiment, by managing the vehicle energy efficiency by area, a vehicle with good energy efficiency is identified, and a host vehicle is controlled so that the energy efficiency matches the efficiency of the vehicle with good energy efficiency. Therefore, the energy efficiency includes the information of accelerator opening as the control information of the vehicle drive system relevant to the energy efficiency of the vehicle. The accelerator opening is under control by accelerator control unit 67 of vehicles A, B.

When the power consumption rate or fuel consumption rate are measured as instantaneous values, the measurement time, vehicle position, and accelerator opening correspond to the respective instantaneous values, and, thus, respective detection values of the time, the vehicle position, and the measurement of accelerator pedal opening sensor 20 corresponding each instantaneous value. Further, when the power consumption rate or fuel consumption rate is measured by average, the measurement time may be set as the intermediate time at which the average are measured while the vehicle position is set as an intermediate position, and the accelerator opening may be obtained from average.

Vehicles A, B acquire the information described above from integrated control unit and 60 send from server communication unit 52 to server 100 information containing energy information of respective vehicles A, B. The energy information acquiring unit 111 obtains the energy information out of the information received with communication unit 102.

Database management section or unit 112 stores the energy information acquired by the energy information acquiring unit 111 in the database 101, and updates the recorded data in database 101, thus managing the database.

In each area separated from each other in the database 101, the vehicle identification unit 113 identifies the vehicle with good energy efficiency. Further, when the vehicle A or B requests to obtain the energy information of the server 100, the vehicle identification unit 113 sends the information of the accelerator opening of the vehicle in an area corresponding to the request with good energy efficiency via communication unit 102. Subsequently, the host vehicle will be controlled to improve energy efficiency by accelerator pedal device 200 in accordance with the accelerator opening of the vehicle with good energy efficiency, that has been identified by vehicle identification unit 113.

Vehicle A, B is provided with TCU 50, integrated C/U 60, and memory 91, respectively. TCU 50 has an inter-vehicle communication unit 51 for transmitting and receiving signals by radio with the other vehicle traveling around, and a server communication unit 52 for transmitting and receiving signals by radio with the server 100. Memory 91 is a recording medium for recording information managed by the integrated control unit 60, information received by the inter-vehicle communication unit 51, and the information received by the server communication unit 52.

Figures 9, 10:
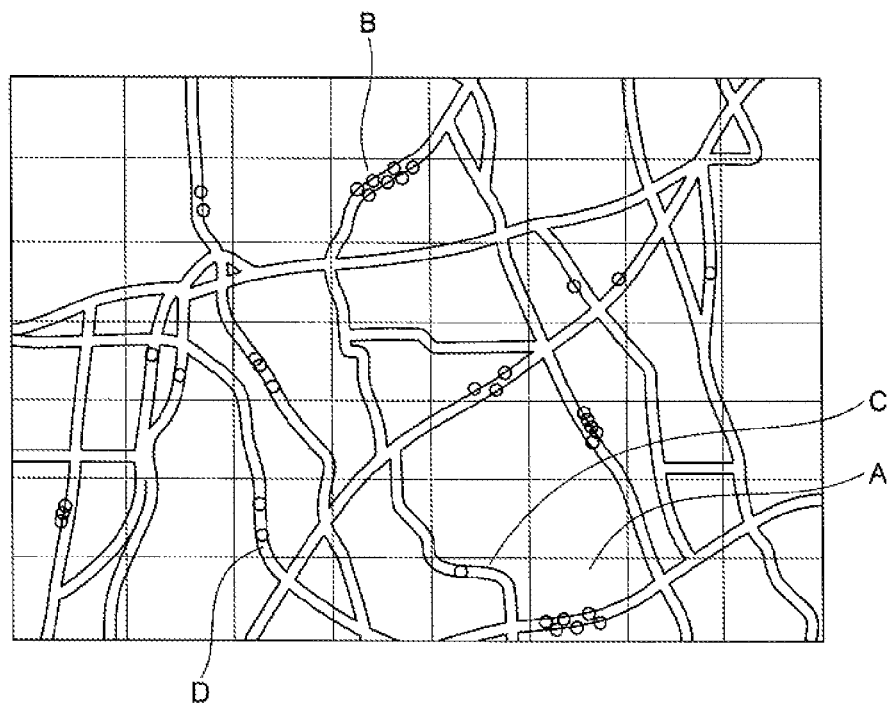
FIG. 9 is a conceptual diagram for explaining the map date and the energy information managed by the server.
FIG. 10 is a conceptual view of data stored in the database of FIG. 7.

Now, with reference to FIGS. 7-10, description will be made of the control of the vehicle control system in the present embodiment. FIGS. 8 and 10 are schematic diagrams respectively for explaining the data to be recorded in the database 101. FIG. 9 is a conceptual diagram for explaining the area that is separated or partitioned on the map data.

First, description is made of the control of transmitting energy information to the server 100 from vehicle A, B. The integrated control unit 60, while the vehicle is traveling, measures a power consumption of the battery 30, an accelerator opening and a fuel consumption of fuel at predetermined intervals for storing in the memory 91. In addition, integrated control unit 60 manages a travel path and travel hours (travel time) of the vehicle by navigation system 66. Then, in association with the travel time and a measurement time, the integrated control unit 60, with respect to the measurement time, stores the position of the vehicle, the accelerator opening degree, power consumption rate and fuel consumption rate in memory 91.

The integrated control unit 60 sends, for example at the timing of on and off of the main switch (not shown) when stopping or driving the vehicle, by a server communication unit 52 the energy information stored or recorded in the memory 91.

Now, description is made of the control of the server 100. Server 100, upon receipt of signals transmitted from Vehicle A, B by the communication unit 102, acquires energy information through energy information acquiring unit 111.

In database 101, as shown in FIG. 8, energy information is stored for each vehicle. In the illustrated example in FIG. 8, the position of the vehicle is represented by latitude and longitude, the accelerator opening degree is represented by angle (degrees), the power consumption rate in Wh/km, and the fuel consumption rate is expressed in km/L. In FIG. 8, for ease of illustration, the vehicle A to E show one piece of the energy information for each vehicle A to E. For each vehicle A to E, a plurality of pieces of energy information is recorded respectively. Without being limited to vehicle A to E, energy information of other vehicle is also recorded.

In FIG. 8, for example, as an energy information of the vehicle A, measurement time (17:20), vehicle position (latitude aaa, longitude bbb), vehicle type (medium-sized), accelerator pedal opening (10 degrees), power consumption rate (80 Wh/km) and fuel consumption rate (0 km/L) are recorded, respectively.

Further, the energy information transmitted from vehicle A, B is the information per travel of vehicle A, B, obtained by integrated control unit 60. Therefore, energy information acquisition unit 111, when a plurality of energy information is included in a signal received by communication unit 102, acquires respective energy information. Subsequently, database management unit 112 stores the plurality of energy information in database 101.

Now, description is made of a plurality of areas managed by server C/U 110. As shown in FIG. 9, in the present embodiment, map data is managed by being separated in a lattice shape in multiple areas. The size of area is predetermined and may be associated with a mesh that is used in navigation application systems, for example. Further, each area includes links and nodes.

As described above, the energy information contains the positional information of the vehicle. Therefore, when the energy information is plotted while corresponding to the position to the associated area, the results are shown in FIG. 9. For example, in area A six pieces of energy information are included.

The vehicle identification unit 113 identifies a vehicle with high energy efficiency by area and vehicle type/model based on the energy information recorded in the database 101. More specifically, with reference to position information of the energy information in each area, the vehicle identification unit 113 extracts the energy information located in the same area. In the example of FIG. 8, since both the position of vehicle A and the position of the vehicle D is in the same longitude aaa, latitude bbb, the energy information of vehicle A and that of vehicle D are extracted as information belonging to the same area or section.

Subsequent to separating the energy information by area based on the position information, vehicle identification unit 113 performs categorization by vehicle model/type. In the example of FIG. 8, since the vehicle type of the vehicle A and D are the same, i.e., medium sized, the energy information of vehicles A and D. will be in the same section.

Further, the vehicle identification unit 113 extracts the energy information for a measurement time which is a predetermined time period before a predetermined reference time and excludes the past energy information prior to the measurement time. The predetermined reference time represents a point in time indicating the start (or end) of a predetermined period by which a full day is divided, for example.

When identifying or specifying the vehicle with good energy efficiency in each area. The road situation may change with time, thus, if the time interval is substantial, the energy efficiency will be evaluated under different road situations even in the same area. Therefore, after the energy information to be compared is separated by the predetermined time, the energy information is extracted and the vehicle with high energy efficiency will be identified.

For example, assumption is made that the predetermined time described above is set for fifteen minutes and the reference point in time is set 17:15. In these conditions, the energy information of vehicle A and the energy information of vehicle D shown in FIG. 8 represents the information within fifteen minutes of the reference point in time (17:15). Thus the vehicle identification unit 113 extracts the energy information associated with vehicle A, and D in order to identify the vehicle with good energy efficiency. On the other hand, another assumption is made that a vehicle having the same position information of the area to which the vehicle A belongs to as well as the same vehicle model information as the vehicle A is recorded in database 101, and the measurement time is 17:05. When the energy information is recorded, the vehicle identification unit 113 does not extract the energy information for the information for the identification of the vehicle with good energy efficiency. Rather, the energy information will be extracted for identification of a vehicle with good energy efficiency in the other time segment.

After the vehicle identification unit 113 has extracted energy information by area based on the conditions of vehicle position, vehicle model and measurement time, a vehicle with good energy efficiency is identified by comparing power consumption rates of each energy information. At this time, the energy information indicating fuel consumption rate exceeding "0" may be omitted, because of poor energy efficiency due to fuel consumption, from the information for identification of a vehicle with good energy efficiency.

In the example in FIG. 8, since the power consumption rate (Wh/km) of vehicle D is lower than the power consumption rate of the vehicle A, the vehicle identification unit 113 identifies vehicle D as a vehicle with good energy efficiency. Further, when three or more energy information is available for comparison of power consumption rate to one another by area, the vehicle with energy information of least power consumption rate is identified as the vehicle with good energy efficiency. In addition, vehicle identification unit 113 similarly identifies a vehicle with good energy efficiency with respect to the other vehicle models such as small-sized vehicle, etc., than medium-sized one.

Having identified the vehicle with good energy efficiency by area by vehicle identification unit 113, database management unit 112 records or stores the vehicles with good energy efficiency in a Table shown in FIG. 10. For example, the tale in FIG. 10 is assumed to represent a table of vehicles with good energy efficiency in area B in FIG. 9. Further assumption is made that the positions of energy information associated with vehicle A, D belong to area B.

In this case, as described above, by the vehicle identification control by the vehicle identification unit 113, in the area B, the vehicle D has been identified as a vehicle with good energy efficiency. Therefore, in the table shown in FIG. 10, the data of vehicle D in FIG. 8 is stored as the medium-sized vehicle. With respect to the other models, as well, by the table in FIG. 10, the energy information of the vehicle identified by the vehicle identification control of the vehicle identification unit 113 I-is recorded in the database 101. That is, since the table shown in FIG. 10 is provided in each area, the server C/U 110 may identify the energy information of the vehicle with best energy efficiency in the relevant area by referring to the table.

Thus, vehicle identification unit 113, after having identified the area corresponding to the position information of the energy information acquired through energy information acquiring unit 111, specifies the vehicle with good energy efficiency among a plurality of vehicles belonging to the area identified. In addition, database management unit 112 manages vehicles which are most energy efficient in the area identified by vehicle identification unit 113 on database by the table of FIG. 10.

Vehicle identification unit 113 performs the process of identification of vehicle with good energy efficiency by area in a predetermined cycle. Thus, the energy information of vehicle with good energy efficiency shown in FIG. 10 is updated each time the vehicle with good energy efficiency is further specified.

After at least the table shown in FIG. 10 is constructed, the vehicle identification unit 113 identifies the vehicle with good energy efficiency by area based on the energy information acquired by energy information acquiring unit 111, and subsequently compares the power consumption rate of energy information associated with a vehicle identified to the power consumption rate of vehicle recorded in FIG. 10. Then, when the power consumption rate of the vehicle of new identification is determined lower than the power consumption rate of the vehicle stored in database 101 in the form of table shown in FIG. 10, database management unit 112 update the energy information in database 101 by replacing or rewriting the database 101 by the energy information of the newly identified vehicle.

Thus, data base management unit 112 updates the information stored in the database 101 when identifying the vehicle with better energy efficiency based on the energy information acquired through energy acquiring unit 111.

Now, description is made of the control of the vehicle control system in the present embodiment when a request for acquisition of energy information of the vehicle with good energy efficiency from vehicle A, B.

The integrated control unit 60 of vehicle A, B, after main switch having been turned ON, transmits to server 100 the request signal for acquisition of energy information of the vehicle with good energy efficiency. In this case, when navigation system 66 specifies a travel route from the current position to the destination and the traveling time of the travel route is predicted, integrated control unit 60 transmits to the server 100 including on the travel time and the travel route in the request signal, Server C/U 110 receives the request signal from vehicle A, B by the communication unit 102. Among the information stored in the database 101, the vehicle identification unit 113 identifies the vehicle with best energy efficiency by referring to the information including the vehicles with good energy efficiency by area (information in the table of FIG. 10) and the position information of the vehicle that transmits the request signal.

Specifically, in the case that the vehicle A has sent the request signal including the position information indicating the current position, the vehicle identification unit 113 extracts the area including the position information and further extracts the table from database 101 within the extracted area the table corresponding to the time at which vehicle A sends the request signal. Since the table of FIG. 10 identifies the vehicle with best energy efficiency within the time segment separated by a constant time period, the vehicle identification unit 113 extracts a table that corresponds to the transmission time of the request signal by identifying the time segment including the transmission time of the request signal.

Further, when the vehicle A has sent the request signal including the information on the travel route (corresponding to the position information of the vehicle) searched by the navigation system 66 as well as predicted travel time, the vehicle identification unit 113 extracts a plurality of areas that include the position information indicated by the travel route. Further, vehicle identification unit 113 extracts within the plurality of extracted a table from database 101, which corresponds to the predicted travel time.

Further, vehicle identification unit 113 identifies the vehicle of the same modes as vehicle A as the vehicle with best energy efficiency among the tables of extraction, and extracts from the table the energy information associated with the vehicle.

Then, from the table that extracted and identified as the vehicle most energy efficient, the same model vehicle with the vehicle A, vehicle identification unit 113 extracts from the table the energy information of the vehicle.

For example, assumption is made that the table of FIG. 10a represent the table of area B in FIG. 9, the current position of vehicle A is in area B, and the transmission time of request signal from vehicle A is identified at 17:18. Vehicle identification unit 113 identifies area B based on the current position of vehicle A, and, based on the transmission time of request signal and the area B identified, extracts a table in FIG. 10 from database 101. Subsequently, vehicle identification unit 113 identifies from the table the vehicle D of the same model as vehicle A as the vehicle with best energy efficiency to extract the energy information related to vehicle. After identifying the vehicle that is most energy efficient, integrated control unit 60 extracts the information of the accelerator opening degree from the energy information of the vehicle identified. Then, integrated control unit 60 sends to the vehicle A, as a response signal to the request signal from the vehicle A, the accelerator opening degree of the vehicle that is most energy efficient.

Vehicle A receives a signal of the accelerator opening degree from the server 100. When the current position of vehicle A is within the area of location corresponds to the area of the most energy efficient vehicle, or vehicle A is approaching the area, the accelerator pedal controller 67 compares the accelerator opening degree received with a predetermined threshold for pedal force increase (A0).

Then, when the accelerator opening degree that is received is greater than the threshold for pedal force increase (Ao), the accelerator pedal control unit 67 sets the accelerator opening (Ao) which has been received. On the other hand, when the accelerator pedal opening is less than the threshold value for pedal force increase (A0), accelerator pedal control unit 67 withholds to change the threshold for pedal force increase (Ao).

Thus, on the basis of the accelerator opening degree of the other vehicle identified as having good energy efficiency, by controlling the accelerator pedal device 200 of a drive system of own vehicle, the accelerator pedal control unit 67 controls to increase pedal force by accelerator pedal device 200 at a smaller accelerator opening than the predetermined threshold value for pedal force increase (A0). In addition, since the newly set threshold value for pedal force increase (Ao) is defined in accordance with accelerator opening of a vehicle with the good energy efficiency in the area of interest, vehicle A may travel to mimic the running pattern (accelerator operation) of the vehicle with good energy efficiency to improve engine efficiency of vehicle A.

Figure 11:
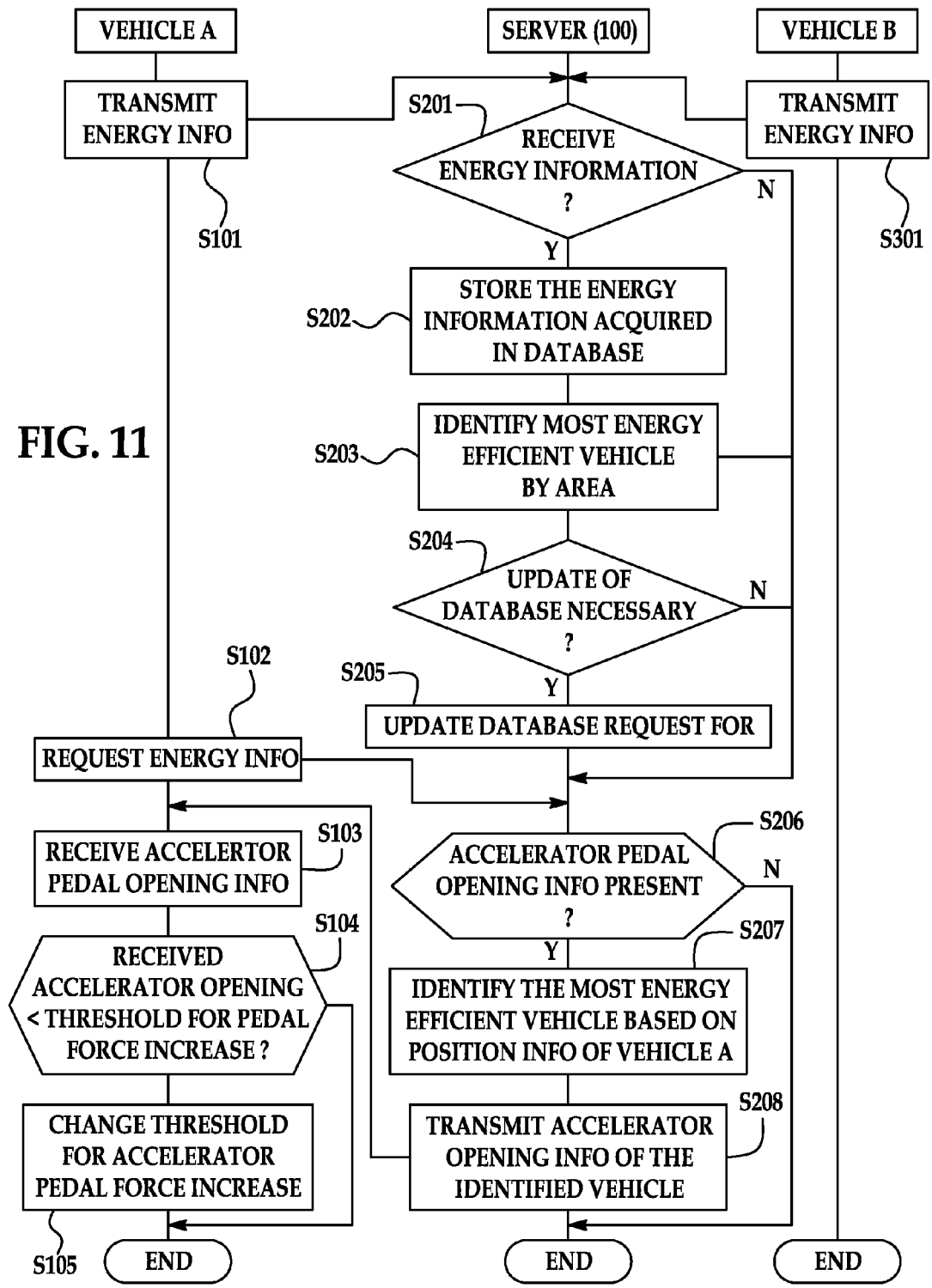
FIG. 11 is a flow chart of the control procedure in the system of FIG. 7.

Now, with reference to FIG. 11, a description will be given of a control flow of the vehicle control system. FIG. 11 is a flowchart showing a control procedure of the vehicle control system.

In step S101, the vehicle A transmits to the server 100 the energy information stored in the memory 91. In step S301, the vehicle B transmits to the server 100 the energy information stored in the memory 91.

In step S201, server C/U110 of server 100 determines whether or not the communication unit 102 has received the energy information. When the energy information is not received, control returns to step S206.

When the energy information has been received, energy information acquiring unit 111 acquires energy information from the signal received at communication unit 102, while database management unit 112 stores or records the energy information acquired in database 101. When storing energy information in database 101, the database management unit 112 correlates and stores the position information, vehicle model information and measurement time information with the information already stored in database 101.

In step S203, based on the energy information stored in the database 101, for each area, the vehicle identification unit 113 identifies the vehicle that is most energy efficient.

At step S204, the database management unit 112 compares the energy information of the vehicle recorded in table (table of FIG. 10) as the vehicle with best energy efficiency and the energy information of the vehicle identified in Step S203 for determination whether or not to update the table in the database 101.

When the power consumption rate of the vehicle identified in step S203 is lower than the power consumption of the vehicle in the table of FIG. 10, the data management unit 112 determines that it is necessary to update the database 101. Then, in step S205, the database management unit 112 updates the database 101. On the other hand, when determined at step 204 that it is not necessary to update the database 101, control returns to step S206.

Returning now to the control on the side of vehicle A, integrated control unit 60 transmits the signal regarding a request for energy information to server 100 in step S102.

Turning to the control on the side of server 100, integrated control unit 60 determined in step S206 whether or not it has received a control signal regarding acquisition of energy information from the vehicle. Without such request for energy information, the control on the side of server 100 will end.

If there is a request for energy information from the vehicle, at step S207, the vehicle identification unit 113 identifies, by referring to the information stored in the database 101 based on the position information of vehicle A, a vehicle with best energy efficiency in the area corresponding to the position information. In step S208, the server C/U 110 transmits to the vehicle A a signal of information including at least the accelerator opening degree of the vehicle identified.

Returning to the control on the side of vehicle A, at step S103, the integrated control unit 60 confirms receipt of the information of the accelerator opening degree from the server 100. In step S104, the accelerator pedal control unit 67 compares the accelerator opening degree received to the threshold for pedal force increase (Ao). If the accelerator opening degree received it is smaller than the previously determined threshold for pedal force increase (Ao), the predetermined threshold value for pedal force increase (Ao) will be changed to the accelerator opening received. Subsequently, control on the side of vehicle A will end.

On the other hand, when the accelerator opening degree received is found to be greater than the threshold for pedal force increase (Ao), control on the side of vehicle A ends without changing the threshold (Ao).

As described above, in the present embodiment, by acquiring energy information including at least an accelerator pedal opening of vehicles and, based on the energy information, by identifying a vehicle with good energy efficiency based on the energy information, control is executed on the own or host vehicle based on the accelerator pedal opening of the other vehicle that has been identified as being energy efficient. Thus, in the own vehicle, since the drive system is controlled to mimic the accelerator opening degree of the vehicle with efficient energy, it is possible to improve the energy efficiency of the own vehicle.

Also, in the present embodiment, the vehicle with good energy efficiency is identified from energy information associated with a plurality of the vehicles in a specific area that is identified on the map data corresponding to the position information in the energy information acquired at energy information acquiring unit 111. Thus, in accordance with the road situation different from area to area, the vehicle with good energy efficiency is identified in each area, by controlling the drive system of the own vehicle based on the accelerator pedal opening of the vehicle identified, energy efficiency may be increased.

Also, in the present embodiment, the position information in the energy information is stored or recorded in database 101 in association with the area on map data, and the vehicle with best energy efficiency is managed in database, and, when an energy-efficient vehicle is newly identified, the database 101 will be updated. Accordingly, even when the vehicle that is more energy efficient is observed, it is possible, responsive to the energy information of this vehicle, to update the data in the database 101 so that it is possible to manage the latest information of the vehicle with good energy efficiency. Further, in response to change in road condition in the form of change in the shape of the road or legal speed, it is possible to respond to the changing road conditions and to manage the information of a new vehicle with good energy efficiency. As a result, it is possible to increase energy efficiency.

Further, in the present embodiment, the energy information recorded in the database 101 is compared with the energy information acquired in the energy information acquiring unit 111 with reference to the corresponding position information to identify the energy-efficient vehicle. Therefore, in the same road condition, comparison of energy information is available so that the accuracy in identifying the energy efficient vehicle may be increased.

In the present embodiment, as one of examples for control of the drive system based on the accelerator opening degree transmitted from the server 100, control of the accelerator pedal device 200 is described. However, the other drive system may be controlled as well.

Now description is made of modification of the present invention. The vehicle A is provided with automatic speed control device. The automatic speed control device is a control device that controls set a speed automatically so as to maintain the set speed of the vehicle even if the driver not step on the accelerator pedal (so-called cruise control). The integrated control unit 60, upon receiving the information of the accelerator opening degree of the energy efficient vehicle from the server 100, calculates, based on the current vehicle speed and the accelerator pedal opening received, a vehicle speed that would be attained when driven at the accelerator pedal opening received, and integrated control unit 60 sets the speed as that of the automatic speed control device.

Thus, in this example, since the automatic speed control device is controlled as drive system based on the accelerator pedal opening degree of the energy efficient vehicle, it is able to increase energy efficiency.

Now description is made of another modification. In the previous embodiment, on the basis of accelerator pedal opening transmitted from server 100, the drive system is controlled by increasing a pedal force against the accelerator depression by the driver. However, alternatively, by omitting depression amount of accelerator pedal by the driver, the accelerator pedal opening under control may be brought in conformity with the accelerator opening of the energy efficient vehicle.

When an accelerator pedal opening signal is transmitter from server 100, and the vehicle travels in the area corresponding to the accelerator opening, integrated control unit 60 compares the accelerator pedal opening sent from server 100 with the accelerator opening being operated by the driver. When the accelerator pedal opening by the accelerator operation is found greater than the accelerator pedal opening transmitted from server, integrated control unit 60 calculates the difference there between and cuts or deletes the difference from the accelerator pedal opening under accelerator operation.

Then, the integrated control unit 60 sends to the motor control unit 80 the accelerator pedal opening degree after being cut, and the motor control unit 80 calculates the torque command value corresponding to the accelerator pedal opening degree to control the inverter 35.

Thus, since, on the basis of the accelerator pedal opening degree of the energy-efficient vehicle, by cutting or diminishing the accelerator opening degree under accelerator operation, inverter 9 of the drive system is controlled to increase energy efficiency.

In the present embodiment, the server 100 transmits to the vehicle A the information of the accelerator pedal opening degree, and vehicle A on its end sets a threshold for the pedal force increase based on the accelerator pedal opening. In the modification to the present embodiment, server 100 sets the threshold for pedal force increase of vehicle A based on the accelerator pedal opening of the vehicle identified by vehicle identification unit 113, and sends to vehicle A a control signal including the set threshold for accelerator pedal increase. Then, on the side of vehicle A, accelerator pedal control unit 200 changes the threshold for pedal force increase previously set to the threshold for pedal force increase included in the received control signal. In other words, server C/U 110 generates a control signal to control the drive system of the vehicle based on the accelerator pedal opening identified by the vehicle identification unit 113 and transmits to vehicle A. Thus, energy efficiency will be increased.

In the present embodiment, energy information is transmitted at the timing of ON and OFF of the main switch (not shown), but may be transmitted so as to correspond to the vehicle speed and the size of the area separated. Since the size of the area is predetermined, when the vehicle speed is determined, the timing crossing the area is also determined. Thus, by transmitting information at the timing across the area by setting the transmission cycle, even if the travel route is not set in advance, depending on the area where the vehicle passes, it is possible to control the drive system of own vehicle in accordance with accelerator pedal opening degrees of the other vehicle having a good energy efficiency.

Further, in the present example, the request signal for acquisition of accelerator pedal opening of the energy-efficient vehicle may be transmitted in the same manner as described above so as to correspond to the size of the area and the vehicle speed.

Incidentally, the vehicle controlled by the vehicle control system of the present embodiment is not limited to the hybrid vehicle shown in FIG. 1. The vehicle may be a hybrid vehicle of other configuration, or an electric vehicle, and vehicles having an engine as the main power source.

The energy information acquiring unit 111 described above corresponds to the "energy information acquiring mechanism" according to the present invention, the vehicle identification unit 113 corresponds to the "identification mechanism", the accelerator pedal control unit 67 or integrated control unit 60 corresponds to the "drive system control mechanism", and the accelerator pedal device 200 corresponds to the "depression force setting mechanism".

Figure 12:
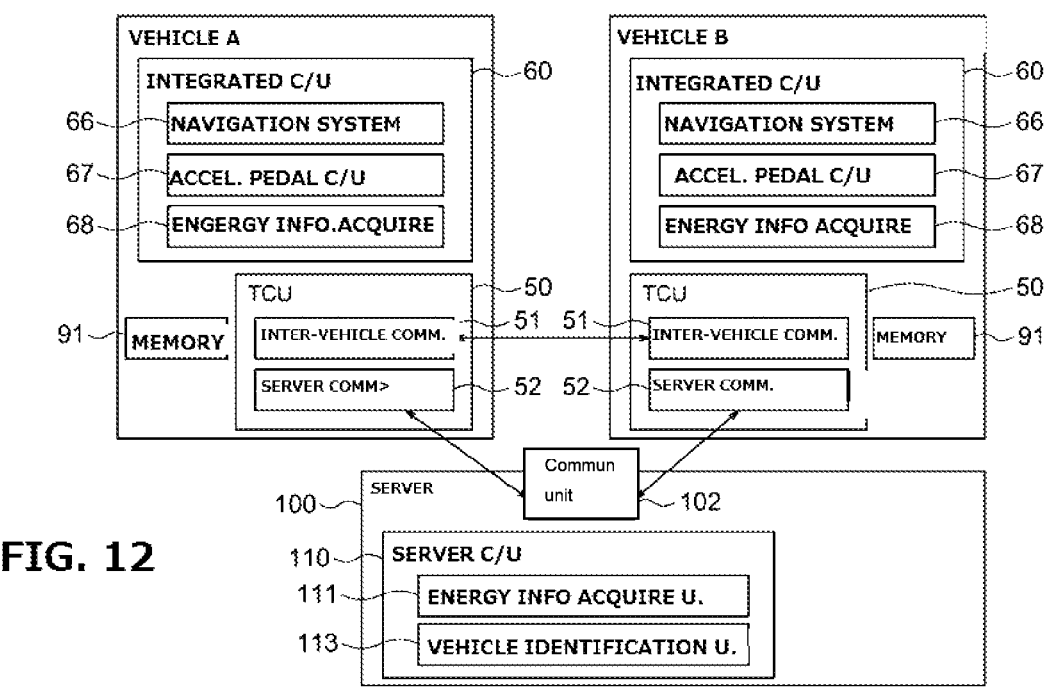
FIG. 12 is a block diagram of a vehicle control system in another embodiment according to the present invention.

FIG. 12 is a block diagram of a vehicle control system pertaining to another embodiment of the present invention. Comparing to the first embodiment described above, a part of the control of the vehicle control system, a database management unit 112 and the database 101 are not provided in the present modification. Other configurations than these are the same as those of the first embodiment described and the description of these may be stored in energy information.

As shown in FIG. 12, integrated control unit 60 of vehicle A, B is provided with an energy information acquiring unit 68 in addition to navigation system 66 and accelerator pedal control unit 67. The energy information acquiring unit 68 acquires energy information for storing in memory 91 acquired from the signal received from other vehicles during a vehicle to vehicle communication between vehicle A and B.

Then, description is made of the control of vehicle control system. First, the control of vehicle A, B is described. The integrated control unit 100 of vehicle A sends and receives with vehicle B travelling in the surrounding area energy information recorded in memory 91 by controlling the inter-vehicle communication unit 51 when acquiring the energy information of the vehicle with good energy efficiency. Further, vehicle A sends and receives energy information with the vehicle other than vehicle B via the inter-vehicle communication in addition to the energy information of vehicle B. Thus, energy information acquiring unit 68 of vehicle A acquires the energy information of the vehicle other than vehicle B. In addition, the energy information sent by inter-vehicle communication device 51 represents energy information in the vehicle running state or condition at the time of transmission. At this time, unlike the first embodiment, the energy information does not include position information and time information. The energy information in this example includes vehicle model, accelerator pedal opening, power consumption rate, and fuel consumption rate.

Subsequently, integrated control unit 60 of vehicle A sends a request signal to the server to acquire the energy information of the vehicle with good energy efficiency. At this time, integrated control unit 60 sends to server 100 the energy information of the other vehicle acquired by the inter-vehicle communication described above.

Now, description is made of the control on the side of server 100. Server C/U 100, upon receipt of the request signal from vehicle A, acquires energy information of the other vehicle from the request signal by energy information acquiring unit 111. Vehicle identification unit 113 extracts the energy information of the same vehicle model as vehicle A from the energy information acquired by energy information acquiring unit 111.

Vehicle identification unit 113 eliminates the energy information whose fuel consumption rate exceeds "0" among the extracted energy information, and then compares the power consumption rates in each of the energy information. Then, vehicle identification unit 113 identifies the vehicle with energy information indicating the least power consumption rate.

In the present example, when locating the vehicle with good energy efficiency by server 100, the vehicle identification unit 113 identifies the vehicle by using the energy information of the other vehicle currently travelling in the surrounding of vehicle A acquired by the inter-vehicle communication. Therefore, with respect to energy information subject to comparison by vehicle identification unit 113, the measurement time is the same time or mutually close to each other.

Further, since the inter-vehicle communication takes place at close range, the position of the energy information to be compared with the vehicle identification unit 113 is located near the vehicle A. Thus, in this example, as in the first embodiment, using the both the position information and information about measurement time, without extracting the information separately, at the time of receipt of energy information, the position information and the measurement time are restricted. Thus, it is not necessary to include the position information and information about measurement time of the vehicle in the energy information sent from vehicle A to server 100. Similarly, due to the communication distance characteristics of inter-vehicle communication, the present example does not require segmentation of energy information divided by area (area shown in FIG. 9) as has been the case in the first embodiment.

Thus, in the present example, the amount of information for communication can be reduced when performing inter-vehicle communication and server communication. In addition, in the server 100, when comparing the energy information to identify the vehicle that is energy efficient, the computational load on the server C/U 110 may thereby be reduced.

After the identification of the vehicle having energy information with the least power consumption rate, vehicle identification unit 113 compares the power consumption rate in the energy information of the vehicle and the reference power consumption rate of the same vehicle model as vehicle A.

It should be noted here that the reference power consumption rate is a threshold value that is previously determined for each vehicle. For example, when the vehicle travels in the previously set travel or running conditions, the reference consumption rate indicates the average power consumption consumed by the battery 30 shown on a percentage basis. In other words, the reference power consumption rate is a threshold value that represents the average energy efficiency of vehicle A and the same vehicle models.

When the power consumption rate of the energy information of the vehicle that has been identified is lower than the reference power consumption rate, the vehicle identification unit 113 specifies the vehicle as energy efficient. The integrated control unit 60 sends the information about accelerator pedal opening of the vehicle identified as energy efficient to vehicle A.

On the other hand, when the power consumption rate in the energy information of the vehicle that has been identified is higher than the reference power consumption rate, the vehicle identification unit 113 does not specify the vehicle as a vehicle with good energy efficiency. The integrated control unit 60 sends to the vehicle A a signal indicating that the accelerator pedal of the other vehicle cannot be used for control.

When the power consumption rate of the energy information of the vehicle that has been identified is lower than the reference power consumption rate, such as when the road vehicle A is traveling is currently congested, the power consumption of the battery 13 is expected to be increased in such situation. In such a case, even when the energy information of the vehicle identified is sent to vehicle A, and vehicle A in turn controls the drive system in accordance with that energy information, the energy efficiency would not be improved.

As another example, when the number of vehicles traveling around of the vehicle A is small, because the number of energy information to be compared with the vehicle identification unit 113 is reduced, the vehicle identification unit 113 might identify the vehicle with low power consumption rate despite the power consumption rate being high originally and being low in energy efficiency. In this case, using the energy information of the vehicle and applying to the control of drive system of vehicle A, the energy efficiency of the vehicle A would not be improved. Therefore, in the present example, when the power consumption rate of energy information of the vehicle identified is higher than the reference power consumption rate, process does not identify the vehicle as a vehicle with good energy efficiency.

Since the control on the drive system of vehicle A after receipt of information of accelerator pedal opening is similar to those of the control in the first embodiment, description thereof is omitted.

Figure 13:
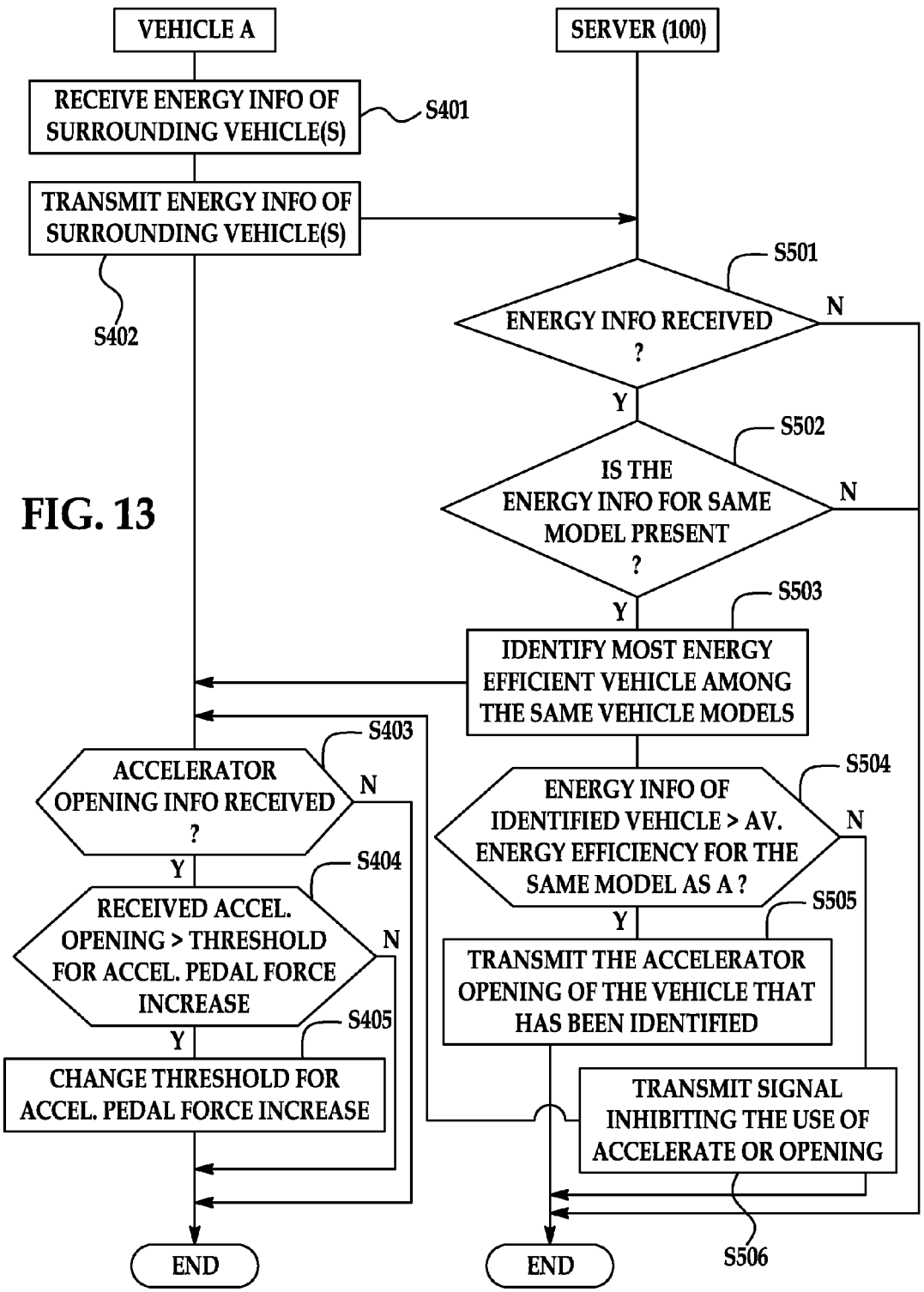
FIG. 13 is a flow chart of the control procedure in the system shown in FIG. 7.

Next, referring to FIG. 13, a description will be given of a control flow of the vehicle control system. FIG. 13 is a flowchart showing a control procedure of the vehicle control system.

In step S401, vehicle A receives energy information from surrounding vehicles by inter-vehicle communication unit 51. In step S402, vehicle A sends by way of server communication unit 52 the information received from the other vehicle, Then control returns to control process on the side of server 100. In step S501, server C/U 110 determines at communication unit 102 whether or not energy information has been received. When the energy information of the same vehicle model is unavailable, the control on the server 100 will end.

On receiving the energy information, the vehicle identification unit 113 determines in step S502, among the energy information received, whether or not there is energy information of the same vehicle model. If there is no energy information of the same model, control ends on the side on server 100.

In cases where the energy information of the same model is available, the vehicle identification unit 113 identifies the most energy efficient vehicle in step S503 among the energy information of the same model, by comparing the power consumption rates. In step S504, the vehicle identification unit 113 compares the power consumption rate of the vehicle identified in step S503 with the reference power consumption rate, and, determines whether or not the energy efficiency of the vehicle identified is larger than the average energy efficiency of the same type as vehicle A.

When the power consumption rate of the vehicle that has been identified is higher than the reference power consumption rate, the server C/U 110 transmits the accelerator pedal opening information of the vehicle identified to vehicle A in step S505.

On the other hand, when the power consumption rate of the vehicle that has been identified is less than the reference rate of power consumption, in step S506, the server C/U 110 transmits to the vehicle A signal indicating that it is not possible to use the accelerator pedal opening degree of the other vehicle. Returning now to the control on the side of vehicle A, because the control of the steps S403~S405 is similar to steps S103 to S105 in FIG. 11, description thereof is hereby omitted.

Returning now to the control on the side of vehicle A, because the control of the steps S403~S405 is similar to steps S103 to S105 in FIG. 11, description thereof is hereby omitted.

As described above, in the present example, by obtaining the energy information of the other vehicle traveling around the own vehicle and transmitting to the server from the own vehicle the energy information of the other vehicle, the server acquires the energy information of the other vehicle. Subsequently, server 100 identifies a vehicle with good energy efficiency based on the energy efficiency of the other vehicle. By this configuration, since the server is not required to use the position information and time information of the vehicle when identifying the information the vehicle with good energy efficiency, the amount of data during communication process may be reduced and the accuracy in identifying the energy efficiency may be increased.

Note that, in the present example, although the identification of the vehicle with good energy efficiency is performed by the control of the server 100, this may take place on the vehicle side. In this case, the reference power consumption rate may be stored in memory 91. Thus, it is not necessary to transmit energy information of the vehicle travelling around the surrounding of the own vehicle to server 100.

The energy information acquiring unit 68 corresponds to the "second energy information acquiring mechanism".

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle control system for a subject vehicle comprising:
   a first energy information acquiring mechanism configured to acquire energy information including at least an accelerator pedal opening degree, of a plurality of vehicles other than the subject vehicle;
   an identification mechanism configured to identify a vehicle with good energy efficiency among the plurality of vehicles based on the energy information acquired; and
   a drive system control mechanism configured to control a drive system of the subject vehicle based on the accelerator pedal opening degree associated with the vehicle with good energy efficiency identified by the identification mechanism, wherein controlling the drive system comprises:
      comparing the accelerator pedal opening degree of the vehicle with good energy efficiency with a predetermined threshold; and
      changing control of the drive system of the subject vehicle based on the comparison.

2. The vehicle control system as claimed in claim 1, wherein the energy information includes a-position information of the subject vehicle and each of the plurality of vehicles, and the identification mechanism is further configured to:
   identify a predetermined area on map data corresponding to the position information in the energy information; and
   identify the vehicle with good energy efficiency among the plurality of vehicles belonging to the predetermined area based on the energy information of the plurality of vehicles belonging to the predetermined area.

3. The vehicle control system as claimed in claim 2 further comprising:
   a database configured to store the energy information while corresponding the position information of the subject vehicle and each of the plurality of vehicles included in the predetermined area on the map data; and
   a database management mechanism configured to manage the database, including managing identification of a vehicle with best energy efficiency in the predetermined area and updating information stored in the database when the vehicle of good energy efficiency has been newly identified based on the energy information acquired by the first energy information acquiring mechanism.

4. The vehicle control system as claimed in claim 2 further comprising:
   a database configured to store the energy information with the position information of vehicles in the predetermined area on the map data; and
   a database management mechanism configured to manage the database, including managing identification of a vehicle with best energy efficiency in the predetermined area and updating information stored in the database when a vehicle of better energy efficiency has been newly identified based on the energy information acquired by the first energy information acquiring mechanism.

5. The vehicle control system as calmed in claim 3, wherein the identification mechanism identifies the vehicle with good energy efficiency by comparing the energy information stored in the database and the energy information acquired by the first energy information acquiring mechanism using the position information.

6. The vehicle control system as claimed in claim 4, wherein the identification mechanism identifies the vehicle with better energy efficiency by comparing the energy information stored in the database and the energy information acquired by the first energy information acquiring mechanism using the position information.

7. The vehicle control system as claimed in claim 1, wherein the identification mechanism identifies the vehicle with good energy efficiency by comparing the energy efficiency indicated by the energy information acquired by the first energy information acquiring mechanism with a reference value of the energy efficiency.

8. The vehicle control system as claimed in claim 1, wherein the drive system sets the predetermined threshold using a depression force setting mechanism configured to set a reference depression force of an accelerator pedal of the subject vehicle based on the accelerator pedal opening degree of the subject vehicle detected by an accelerator pedal opening detection mechanism, and
   the drive system control mechanism increases the depression force of the accelerator pedal higher than the reference depression force based on the accelerator pedal-opening degree of the vehicle of good energy efficiency identified by the identification mechanism.

9. The vehicle control system as claimed in claim 1, wherein changing control of the drive system comprises the drive system control mechanism setting a speed of the subject vehicle based on the comparison of accelerator pedal opening degree of the vehicle with good energy efficiency identified by the identification mechanism and the subject vehicle.

10. The vehicle control system as claimed in claim 1, wherein the drive system control mechanism controls the drive system by reducing the accelerator pedal opening degree of the subject vehicle by a difference between the accelerator pedal opening degree of the vehicle with good energy efficiency and the accelerator pedal opening degree of the subject vehicle in the comparison.

11. A server for managing a plurality of vehicles comprising:
    an energy information acquiring mechanism configured to acquire energy information of a plurality of vehicles indicating an energy efficiency including at least information about an accelerator pedal opening degree of each of the plurality of vehicles; and
    an identification mechanism configured to identify a vehicle with good energy efficiency among the plurality of the vehicles based on the energy information, wherein the server transmits a signal including information based on the accelerator pedal opening of the vehicle with good energy efficiency to a subject vehicle in the plurality of vehicles, and wherein the subject vehicle has a drive system control mechanism configured to change control of the drive system based on the accelerator pedal opening of the vehicle with good energy efficiency.

12. The server as claimed in claim 11, wherein the server transmits to the subject vehicle by generating a control signal that controls a drive system provided with the subject vehicle based on the accelerator pedal opening of the vehicle with good energy efficiency.

13. The server as claimed in claim 11, wherein the energy information acquiring mechanism acquires the energy information of the plurality of vehicles traveling in a surrounding area of the subject vehicle via the subject vehicle.

14. A vehicle control device comprising:
    an energy information acquiring mechanism configured to acquire energy information indicating an energy efficiency of a plurality of vehicles including information indicating the accelerator pedal opening degree of each vehicle, the plurality of vehicles including a subject vehicle and other vehicles travelling around a surrounding area of the subject vehicle;
    a communication unit configured to transmit the energy information of the other vehicles acquired by the energy information acquiring mechanism to the subject vehicle;
    an identification mechanism configured to identify a vehicle with good energy efficiency among the other vehicles based on the energy information acquired; and
    a drive system control mechanism configured to change operation of a drive system provided with the subject vehicle based on the accelerator pedal opening of the vehicle with good energy efficiency, wherein operation of the drive system includes one or more of accelerator pedal opening degree, speed and pedal depression force.

* * * * *